United States Patent
Zhou et al.

(10) Patent No.: US 7,466,112 B2
(45) Date of Patent: Dec. 16, 2008

(54) VARIABLE FREQUENCY CURRENT-MODE CONTROL FOR SWITCHED STEP UP-STEP DOWN REGULATORS

(75) Inventors: Xunwei Zhou, San Jose, CA (US); Randy G. Flatness, Los Gatos, CA (US)

(73) Assignee: Linear Technology Corporation, Milpitas, CA (US)

( * ) Notice: Subject to any disclaimer, the term of this patent is extended or adjusted under 35 U.S.C. 154(b) by 282 days.

(21) Appl. No.: 11/052,477

(22) Filed: Feb. 8, 2005

(65) Prior Publication Data
US 2006/0176036 A1    Aug. 10, 2006

(51) Int. Cl.
*G05F 1/613* (2006.01)
(52) U.S. Cl. .................... 323/259; 323/225; 323/285
(58) Field of Classification Search .......... 323/222, 323/282–288, 224, 266, 268, 259, 225; 363/89, 363/95, 97, 98.81, 82, 81
See application file for complete search history.

(56) References Cited

U.S. PATENT DOCUMENTS

| | | | |
|---|---|---|---|
| 4,618,812 A * | 10/1986 | Kawakami | 323/224 |
| 4,683,529 A * | 7/1987 | Bucher, II | 363/44 |
| 5,001,621 A | 3/1991 | Egawa | |
| 5,134,355 A * | 7/1992 | Hastings | 323/211 |
| 5,371,667 A * | 12/1994 | Nakao et al. | 363/124 |
| 5,481,178 A | 1/1996 | Wilcox et al. | |
| 5,552,694 A * | 9/1996 | Appeltans | 323/222 |
| 5,602,463 A * | 2/1997 | Bendall et al. | 323/266 |
| 5,734,258 A | 3/1998 | Esser | |
| 5,889,392 A | 3/1999 | Moore et al. | |
| 6,087,816 A | 7/2000 | Volk | |
| 6,144,194 A * | 11/2000 | Varga | 323/285 |
| 6,166,527 A * | 12/2000 | Dwelley et al. | 323/222 |
| 6,191,567 B1 | 2/2001 | Sluijs | |
| 6,215,286 B1 | 4/2001 | Scoones et al. | |
| 6,275,016 B1 | 8/2001 | Ivanov | |
| 6,348,779 B1 | 2/2002 | Sluijs | |
| 6,411,531 B1 | 6/2002 | Nork et al. | |
| 6,580,258 B2 | 6/2003 | Wilcox et al. | |
| 6,636,431 B2 | 10/2003 | Seki et al. | |
| 6,737,838 B2 | 5/2004 | Sluijs et al. | |
| 6,765,371 B2 | 7/2004 | Kataoka | |
| 6,781,352 B2 | 8/2004 | Athari et al. | |
| 6,812,676 B2 | 11/2004 | Tateishi | |
| 6,859,020 B2 | 2/2005 | Baldwin et al. | |
| 6,977,488 B1 | 12/2005 | Nogawa et al. | |

(Continued)

OTHER PUBLICATIONS

MAXIM Step-Up/Step-Down Li+ Battery Charger, Maxim Integrated Products, MAX1870 A, pp. 1-32.

(Continued)

*Primary Examiner*—Rajnikant B Patel
(74) *Attorney, Agent, or Firm*—McDermott Will & Emery LLP

(57) ABSTRACT

A switched regulator circuit provides step-up and step-down operation in which the level of the input voltage can be greater, equal to, or less than a preset controlled output voltage. A four switch arrangement or two switch arrangement provides buck, boost, and buck-boost regulation under variable frequency valley-peak current mode control. A single sense resistor may be utilized for sensing inductor current during each duty cycle.

44 Claims, 13 Drawing Sheets

U.S. PATENT DOCUMENTS

| | | |
|---|---|---|
| 6,984,967 B2 | 1/2006 | Notman |
| 2002/0145409 A1 | 10/2002 | Umminger et al. |
| 2004/0239299 A1 | 12/2004 | Vinciarelli |
| 2005/0195622 A1 | 9/2005 | Lehman et al. |
| 2006/0055384 A1 | 3/2006 | Jordan et al. |

OTHER PUBLICATIONS

Redl, Richard., et al. "What a Design Engineer Should Know About Current-Mode Control." Design Automation Inc. pp. 18-33.

"Modeling, Analysis and Compensation of the Current-Mode Converter," Unitrode Application Note, U-97, Applications Handbook 1997 Edition, pp. 3-43-3-48.

"Micropower Synchronous Buck-Boost DC/DC Converter." Linear Technology, LTC3440, pp. 1-16.

"No $R_{SENSE}$ Synchronous Step-Up DC/DC Controller." Linear Technology, LTC1700, pp. 1-16.

"High Efficiency Synchronous Step-Down Switching Regulator." Linear Technology, LTC1735, pp. 1-32.

"Wide Operating Range No $R_{SENSE}$ ™ Step-Down Controller." Linear Technology, LTC1778/LTC1778-1, pp. 1-24.

* cited by examiner

VARIABLE FREQUENCY CURRENT-MODE CONTROL FOR SWITCHED STEP UP-STEP DOWN REGULATORS

RELATED APPLICATIONS

This application contains subject matter related to copending U.S. application Ser. No. 11/052,478 of Flatness et al., filed Feb. 8, 2005, copending U.S. application Ser. No. 11/052,480 of Flatness et al., filed Feb. 8, 2005, and copending U.S. application Ser. No. 11/052,473 of Flatness et al., filed Feb. 8, 2005, all commonly assigned with the present application. The disclosures of these applications are incorporated by reference herein.

TECHNICAL FIELD

The present disclosure relates to control of regulators, more particularly to switched regulators that can be operated in boost mode, buck mode and buck-boost mode.

BACKGROUND

Voltage regulators are known that can convert from input voltages above, below, or equal to the controlled output voltage, respectively performing buck mode regulation, boost mode regulation, or buck-boost mode regulation. Regulator architecture typically is provided for power supplies for automotive applications, lap-top computers, telecom equipment and distributed power systems. A known "four-switch" buck-boost converter is described in an October 2001 datasheet for the LTC3440 "Micro-power Synchronous Buck-Boost DC/DC Converter" integrated circuit manufactured by Linear Technology Corporation. Two of the four switches are connected to the input side of an inductor, the other switches connected to the output side. In accordance with the level of voltage output to be controlled and the level of voltage input, the regulator has the capability of assuming a plurality of operation states in which the switches variously are sequentially activated or deactivated, to connect the inductor to the input, the output, and/or a common ground connection. The voltage mode control technique used presents difficulty in compensating for boost and buck-boost mode closed loop operation.

Other known arrangements are simplifications of the "four-switch" configuration in which two of the switches are replaced by diodes. With such arrangements, control flexibility is lessened as fewer different switch operation states are available. Another known alternative is current mode control, wherein a sense resistor is placed permanently in series with the circuit inductor or two sense resistors are used, one at the input and another at the output. Conduction loss is increased significantly by these provisions, as inductor current traverses a sense resistor at all times. A need thus exists for a buck-boost regulator that avoids the aforementioned disadvantages.

SUMMARY OF THE DISCLOSURE

The subject matter described herein fulfills the above-described needs of the prior art. In one aspect, a regulator circuit provides step-up and step-down operation in which the level of the input voltage can be greater, equal to, or less than a preset controlled output voltage. A first switch is connected between a first inductor terminal and an input terminal. A second switch is connected between a second inductor terminal and a node. A first rectifying device is connected between the first inductor terminal and the node. A second rectifying device is connected between the second inductor terminal and an output terminal. A sensing element for sensing inductor current is connected between the common connection and the node joining the second switch and the first rectifying device. A control circuit is responsive to sensed inductor current and a voltage proportional to the output for controlling activation and deactivation of the switches to regulate voltage at the output to a preset voltage.

The control circuit preferably includes comparator circuitry, logic circuits connected to receive input from the comparator circuitry, and switch driver circuitry responsive to the logic circuit for controlling the states of the switches. In the comparator circuitry, an error amplifier has a first input for receiving a voltage proportional to the voltage at the output terminal and a second input for receiving a reference potential to produce a difference signal. A differential circuit is responsive to the difference signal, and the sensed inductor current sensing element and produces an output to the logic circuits. A first circuit section of the differential circuit receives a signal output from the current sensing element of a first polarity and a second circuit section receives the signal output from the current sensing element with inverted polarity.

When the preset output voltage is greater than the input voltage the control circuit operates in a voltage boost mode. The first switch is maintained in an ideally closed state and the second inductor terminal is connected in succession alternately between a common potential, via the second switch in a closed state, and the output terminal, via the second rectifying device. The second switch may be controlled to be off for a fixed time period during each cycle. The second switch is in an on state at the beginning of each cycle, is turned off in response to the sensed current rising to a reference threshold level, and remains off for a fixed time period thereafter to complete the cycle. The terms "variable frequency" and "non-constant frequency" as used throughout are intended to signify that switching is implemented irrespective of a clock signal and that a switch is maintained in either an open state or a closed state for a fixed period of time.

When the preset output voltage is less than the input voltage the control circuit operates in buck mode. The second switch is maintained in an open state and the first inductor terminal is connected in succession alternately between a common potential, via the first rectifying device, and the input terminal, via the first switch in a closed state. The first switch is in an off state at the beginning of each cycle of operation, is turned on in response to the sensed current falling to a reference threshold level, and remains on for a fixed time period thereafter to complete the cycle.

When the input voltage is approximately the same as the preset output voltage the control circuit operates in voltage buck-boost mode in which both switches are in an off state at a beginning portion of each cycle. In response to the sensed current falling to a first threshold level, the first switch is turned on and maintained on for a fixed time period thereafter. At the expiration of the fixed time period, the second switch is turned on. In response to the sensed current rising to a second threshold level thereafter, the second switch is turned off and maintained off for the remainder of the cycle. The first switch is turned off at the end of the cycle.

When the input voltage is slightly less than or the same as the preset output voltage, both switches are in an on state at a beginning portion of each cycle. In response to the sensed current rising to a first threshold level, the second switch is turned off and maintained off for a fixed time period thereafter. At the expiration of the fixed time period, the first switch is turned off. In response to the sensed current falling to a second threshold level thereafter, the first switch is turned on and maintained on for the remainder of the cycle. The second switch is turned on at the end of the cycle.

In another aspect of the disclosure, a first switch of the regulator is connected between the first inductor terminal and the input terminal, a second switch is connected between the first inductor terminal and the common connection, a third switch is connected between the second inductor terminal and the common connection, and a fourth switch is connected between the second inductor terminal and the output terminal. Activation and deactivation of the switches are controlled by a control circuit to regulate voltage at the output to a preset voltage. A logic circuit receives input from comparator circuitry to produce signals to switch driver circuitry for controlling the states of the switches. An error amplifier receives at one input a voltage proportional to the voltage at the output terminal and at a second input a reference potential to produce a difference signal. A differential circuit, responsive to the difference signal and the inductor current sensing element, is connected to the logic circuit. A first circuit section of the differential circuit receives a signal output from the current sensing element and a second circuit section of the differential circuit receives the signal output from the current sensing element with inverted polarity. The four switches are controlled in response to the sensed inductor current and a voltage proportional to the output voltage.

When the preset output voltage is greater than the input voltage the control circuit operates in voltage boost mode. The first switch is maintained in an ideally closed state and the second switch is maintained in an ideally open state. The inductor is connected in succession alternately between a common potential, via the third switch in a closed state, and the output terminal, via the fourth switch in a closed state. The third switch may be controlled to be off for a fixed time period during each cycle. The third switch is in an on state at the beginning of each cycle, is turned off in response to the sensed current rising to a reference threshold level, and remains off for a fixed time period thereafter to complete the cycle.

When the preset output voltage is less than the input voltage the control circuit operates in a voltage buck mode. The third switch is maintained in an open state and the fourth switch is maintained in an ideally closed state. The inductor is connected in succession alternately between a common potential, via the second switch in a closed state, and the input terminal, via the first switch in a closed state. The first switch is in an off state at the beginning of each cycle of operation, is turned on in response to the sensed current falling to a reference threshold level, and remains on for a fixed time period thereafter to complete the cycle.

When the input voltage is approximately the same as the preset output voltage the control circuit operates in voltage buck-boost mode. The first switch and the second switch are controlled to be in reciprocal conductive states with respect to each other and the third switch and the fourth switch are controlled to be in reciprocal conductive states with respect to each other. When the input voltage is slightly greater than or the same as the preset output voltage, at the beginning portion of each cycle the first and third switches are set to an off state and the second and fourth switches are set to an on state. In response to the sensed current falling to a first threshold level, the first switch is turned on and the second switch is turned off, the switches maintained at these states for a first (buck mode) fixed time period thereafter. At the expiration of the fixed time period, the third switch is turned on and the fourth switch is turned off. In response to the sensed current rising to a second threshold level, the third switch is turned off and the fourth switch turned on for a second (boost mode) fixed time period to the end of the cycle.

When the input voltage is slightly less than or the same as the preset output voltage, at the beginning portion of each cycle the first and third switches are set to an on state and the second and fourth switches are set to an off state. In response to the sensed current rising to a first threshold level, the third switch is turned off and the fourth switch is turned on, the switches maintained at these states for a first (boost mode) fixed time period thereafter. At the expiration of the fixed time period, the first switch is turned off and the second switch is turned on. In response to the sensed current falling to a second threshold level, the first switch is turned on and the second switch turned off for a second (buck mode) fixed time period to the end of the cycle. An advantage of the disclosed arrangements is that switch over between buck and boost modes can be made automatically with very short transition time.

In another aspect of the disclosure, current mode regulation is carried out with the use of a single current sensing element. The element may be connected in series with the inductor between the first and fourth switches in the four switch implementation or between the first switch and the second switch in the two switch implementation. Alternatively, the single current sensing element may connected directly between the common node and a junction of the second and third switches in the four switch implementation or a junction of the first rectifying device and the second switch in the two switch implementation. In these latter implementations, the current sensing element conducts current only during a portion of the control cycle, thereby conserving power.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1:
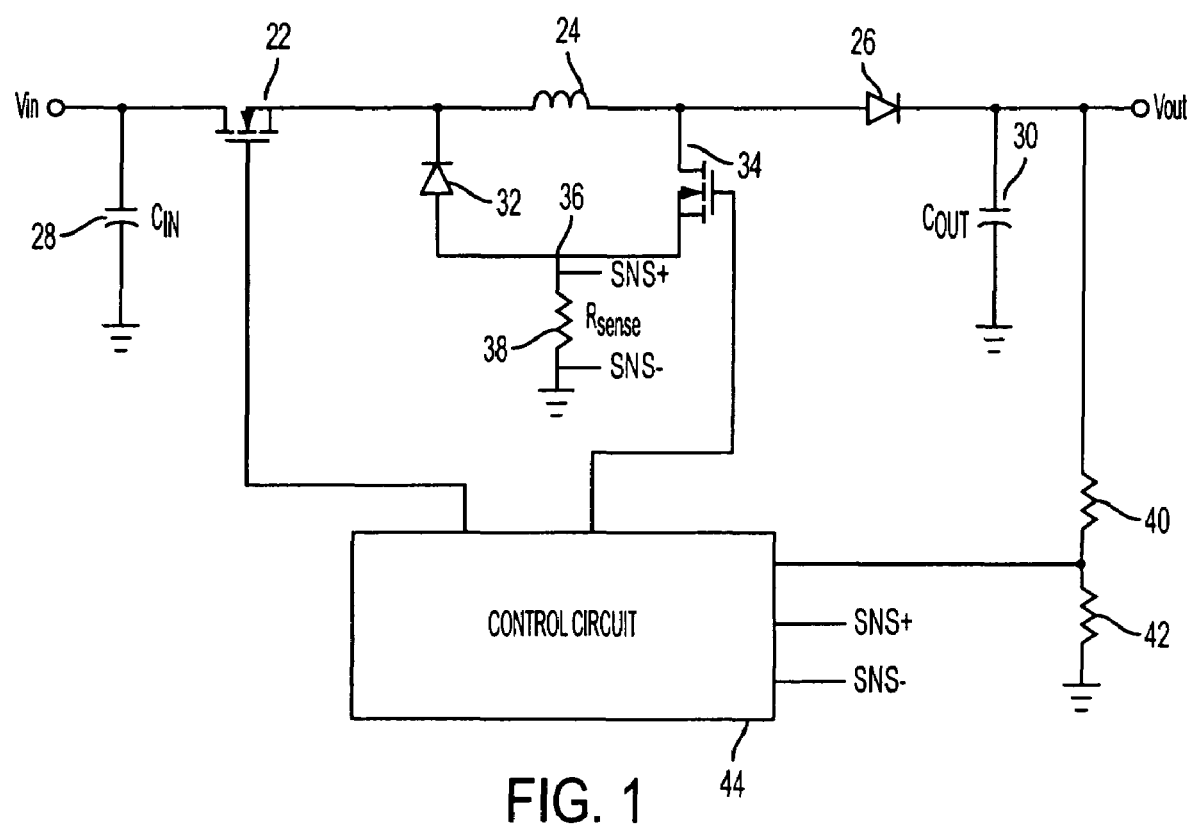
FIG. 1 is a schematic block diagram of a switching regulator in accordance with one embodiment of the present invention.

A switching regulator is represented in the schematic block diagram of FIG. 1. An input voltage from a power supply is applied to input terminal $V_{in}$. A preset output voltage is regulated at the $V_{out}$ terminal. Connected in series between the input and output terminals are a first switch 22, inductor 24, and rectifier 26. Rectifier 26 is connected to conduct current in the direction of the output terminal. Switch 22 preferably is a MOSFET, although any controlled switching device may be utilized.

An input capacitor 23 is connected between the input terminal and the common ground. An output capacitor 30 is connected between the output terminal and the common ground. Rectifier 32 and a second switch 34 are connected across inductor 24 and joined at node 36. Rectifier 32 is connected to conduct current in the direction of the inductor 24. Current sense resistor 38 is connected between node 36 and the common ground. Voltage divider resistors 40 and 42 are connected in series between the output terminal and the common ground.

Control circuit 44 has a first input connected to the junction between resistors 40 and 42, thereby to receive an output feedback voltage at resistor 42. The voltage at resistor 42 is proportional to the output voltage. A second input to control circuit 44 receives the voltage across resistor 38, which represents sensed inductor current. In response to these inputs, the control circuit 44 outputs signals for activation and deactivation of switches 22 and 34 for the various modes of operation.

Figure 2:
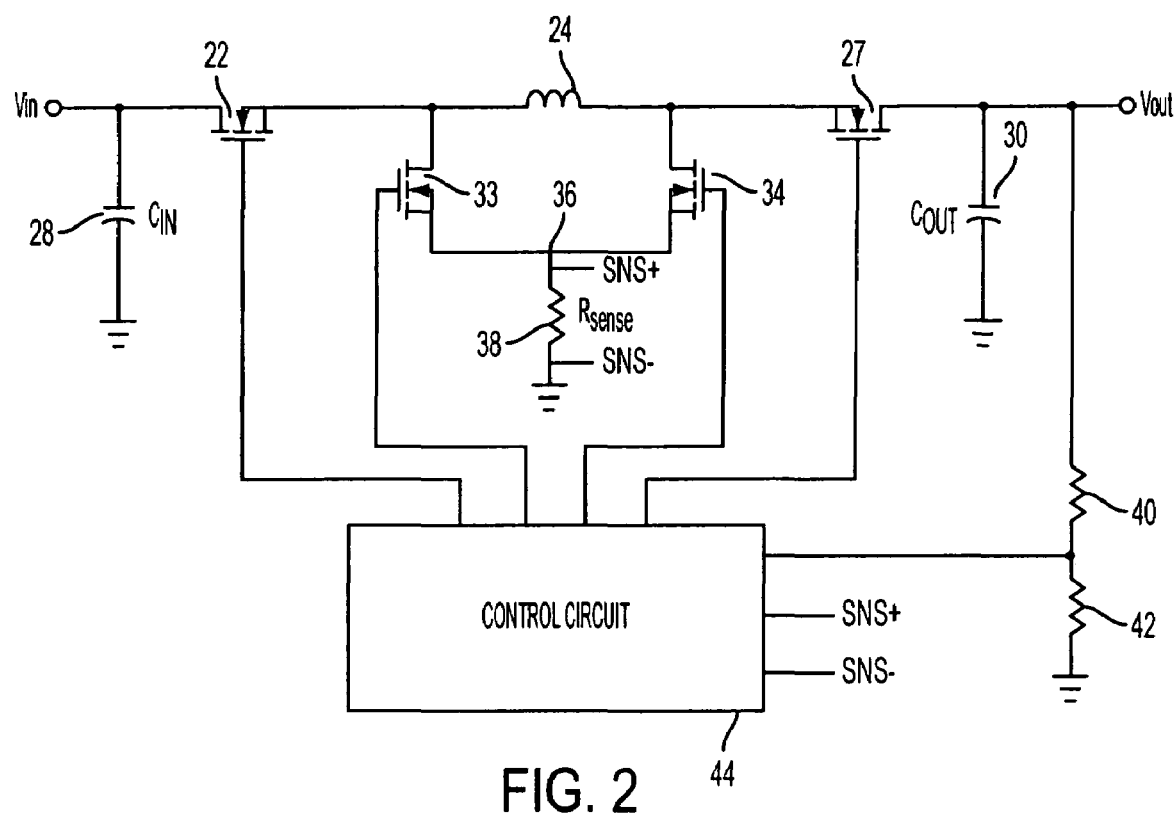
FIG. 2 is a schematic block diagram of a switching regulator in accordance with another embodiment of the present invention.

The switching regulator of FIG. 2 differs from the regulator of FIG. 1 in that switch 27 is connected in place of rectifier 26 and switch 33 is connected in place of rectifier 32. Switches 22 and 33 are controlled to be in reciprocal conductive states with respect to each other and switches 27 and 34 are controlled to be in reciprocal conductive states with respect to each other.

Each of the switching regulators of FIGS. 1 and 2 is capable of providing efficient operation in buck mode, wherein the input voltage is greater than a preset output voltage, boost mode, wherein the input voltage is less than a preset output voltage, and buck-boost mode, wherein the input voltage and preset output voltage are of substantially the same level.

Figure 3A:
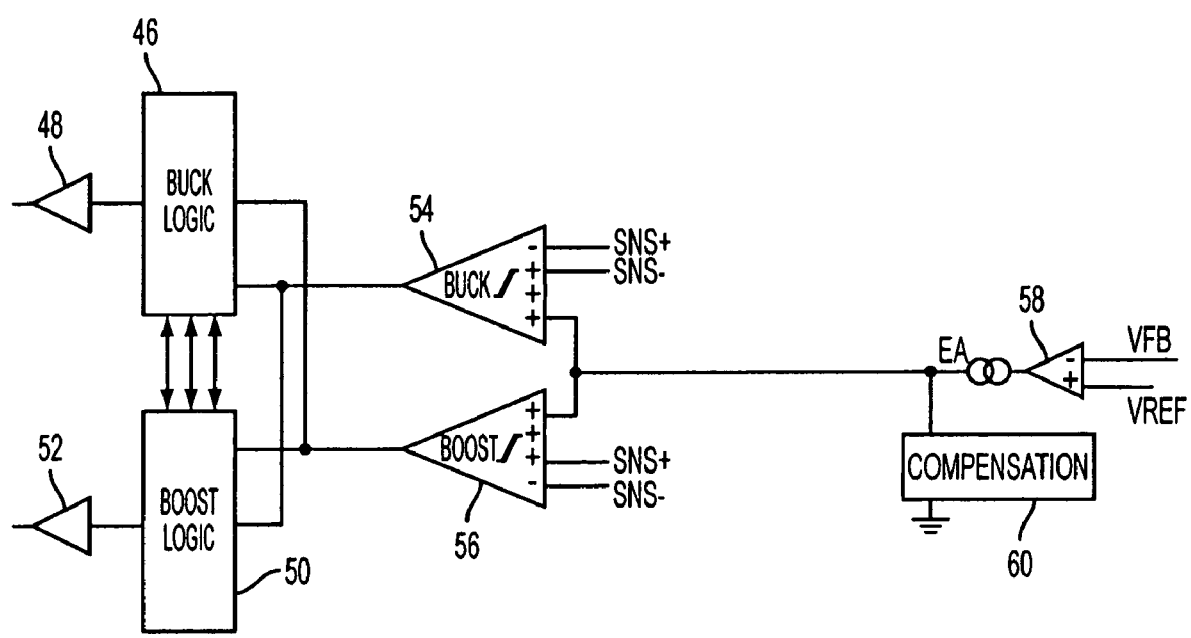
FIGS. 3a and 3b are block diagrams of the current mode control circuits corresponding, respectively, to FIGS. 1 and 2.

FIG. 3a is a block diagram of the control circuit 44 of FIG. 1. An output of buck logic circuit 46 is connected to switch driver 48, which applies gate driving signals to controlled switch 22. An output of boost logic circuit 50 is connected to switch driver 52, which applies gate driving signals to controlled switch 34. An output of buck comparator 54 is connected to an input of buck logic circuit 46 and an input of boost logic 50. An output of boost comparator 56 is connected to an input of buck logic circuit 46 and an input of boost logic 50. Error amplifier 58 outputs a signal corresponding to the difference between the output feedback voltage, taken at the junction between resistors 40 and 42, and a reference voltage. This difference signal is applied as an input to buck comparator 54 and boost comparator 56. Compensation circuit 60, shown connected to the error amplifier output, generates a compensation signal superimposed on the error signal. The compensation circuit may comprise a well-known resistive capacitive arrangement for this purpose, as described, for example, in an article entitled *Modelling, Analysis and Compensation of the Current-Mode Converter*, published in the 1997 edition of Applications Handbook. The compensation signal and difference signal are superimposed and compared by the comparators with the sensed current signal SNS+ SNS−, taken across current sense resistor 38 and applied as additional inputs to the comparators.

Figure 3B:
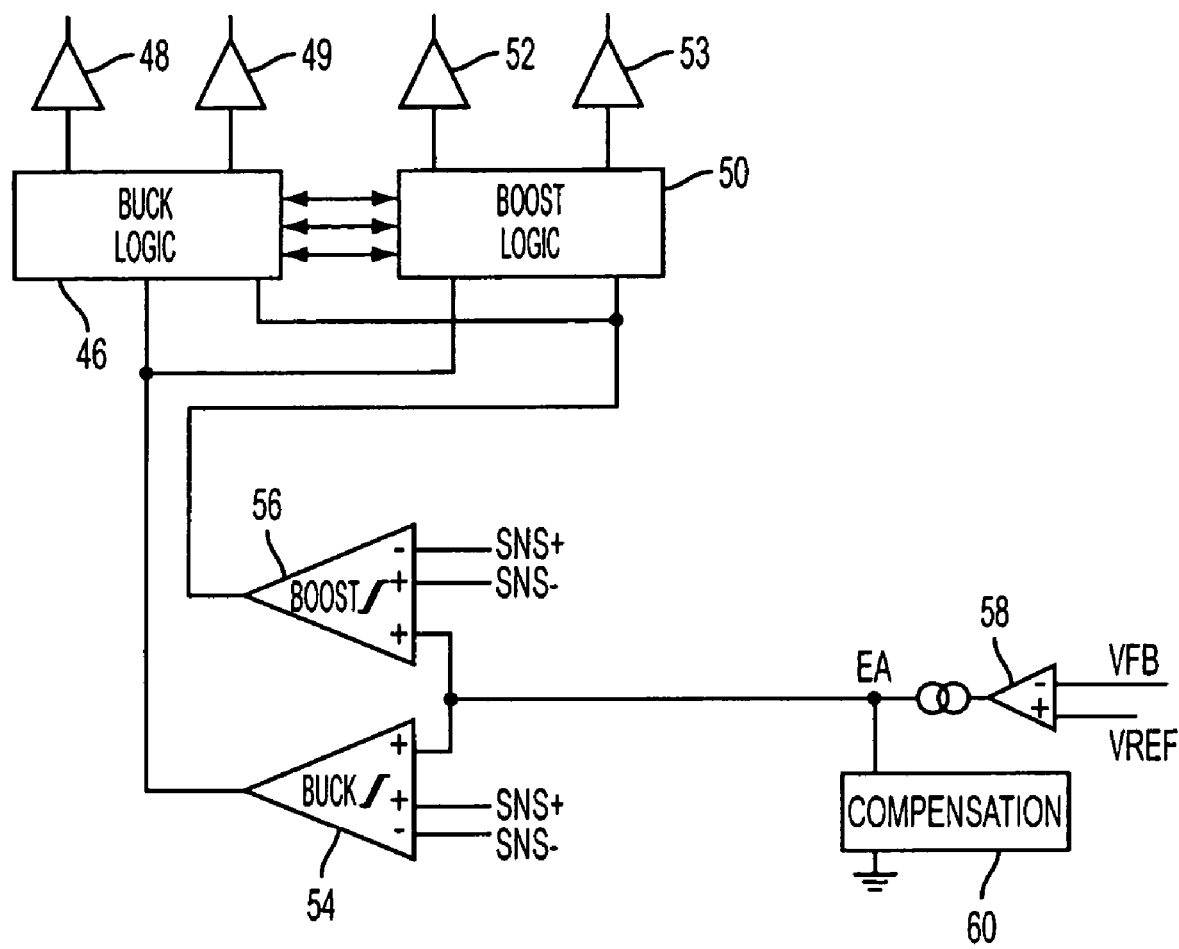

FIG. 3b is a block diagram of the control circuit 44 of FIG. 2. The buck logic circuit 46 outputs signals to switch drivers 48 and 49 that apply driving signals, respectively, to switches 22 and 33. The boost logic circuit 50 outputs signals to switch drivers 52 and 53 that apply driving signals, respectively, to switches 34 and 27. Operation of the control circuit is explained more fully below with respect to the waveforms and flow chart that follow.

Figure 4A:
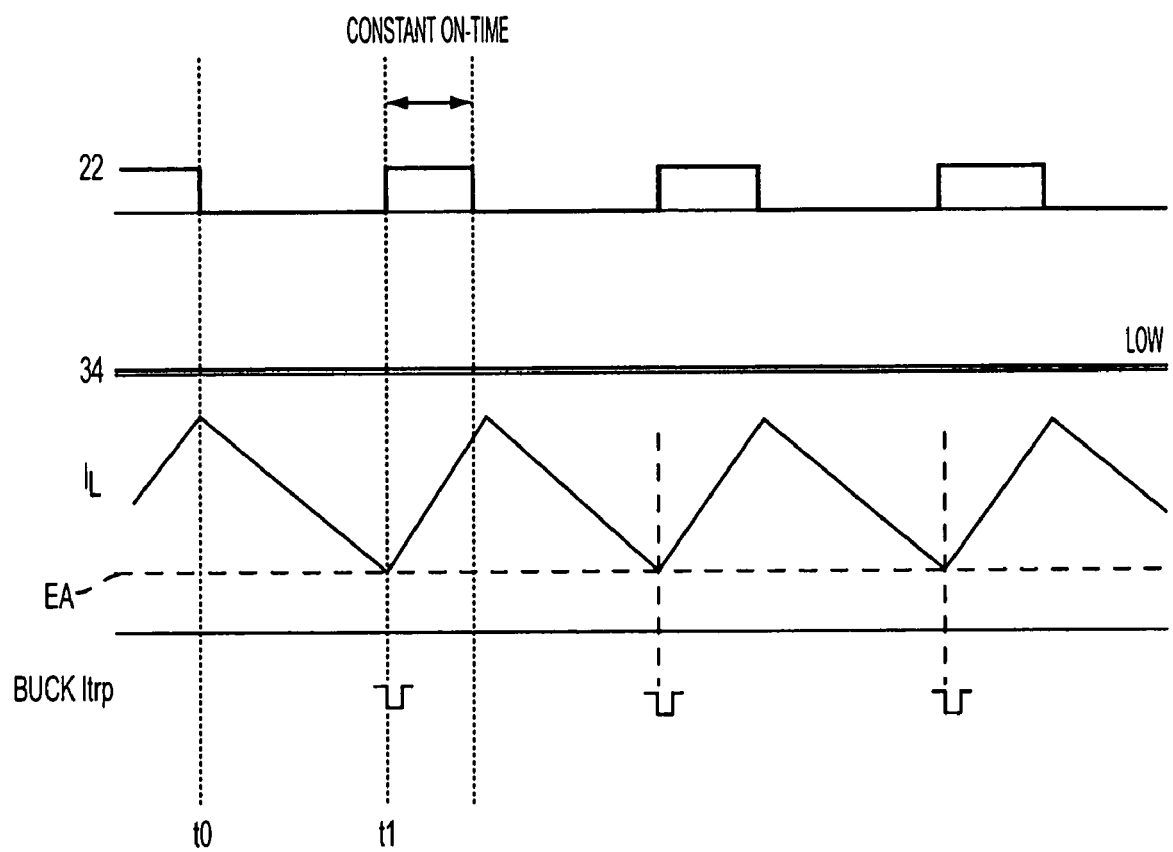
FIG. 4a is a waveform diagram for constant on-time/constant off-time buck mode operation of the regulator of FIG. 1.
Figure 4B:
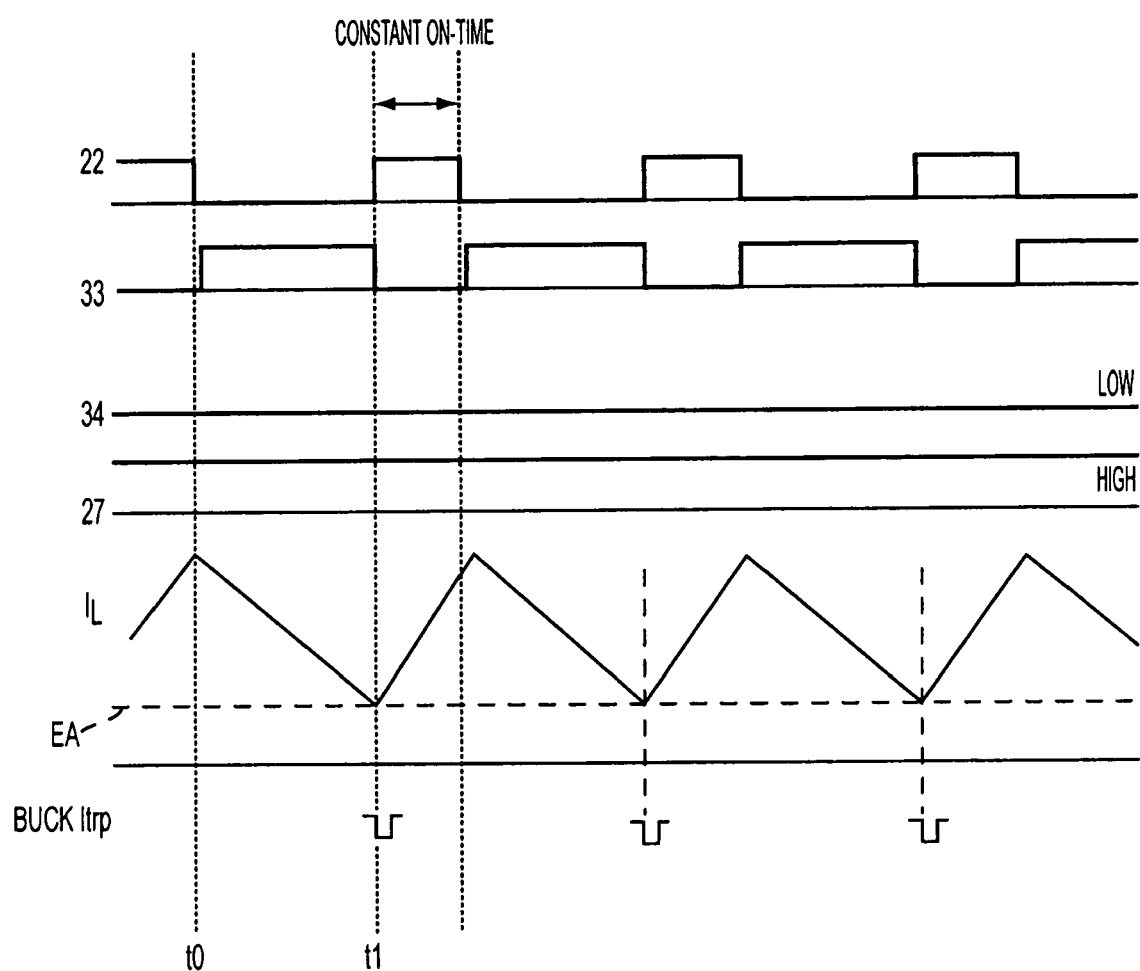
FIG. 4b is a waveform diagram for constant on-time/constant off-time buck mode operation of the regulator of FIG. 2.

Switch controlled operation in buck mode is illustrated by the waveform diagrams of FIGS. 4a and 4b. In the buck mode, the output voltage is regulated to a preset level that is lower than the input voltage. To maintain the preset output voltage, current is applied by the regulator to the output capacitor $C_{OUT}$ at a rate that is controlled in dependence upon the sensed conditions. Buck logic circuit 46 outputs signals for turning on and off switch 22 in response to the output of buck comparator 54, while boost logic circuit 50 maintains switch 34 off throughout the boost mode operation. Boost comparator 56 is disabled at this time.

FIG. 4a illustrates such operation for the regulator of FIG. 1. Switch 34 is maintained in the off state, while switch 22 is switched between the off state and the on state. At $t_0$, switch 22 is turned off. The decreasing inductor current in the path between the common ground and the output terminal is sensed by resistor 38. At time $t_1$, the current has fallen to the valley threshold and control circuit 44 turns on switch 22 to connect the inductor between the input terminal and the output terminal. Switch 22 remains on for a fixed time thereafter. The end of the fixed time terminates the cycle and switch 22 is then again turned off. Operation continues in this manner. The time period for each individual cycle is the sum of the sensing period in which the switch 22 is off and the fixed period in which the switch 22 is on. As the sensing period may be variable, the switching frequency may also be variable. The on-time of switch 22 may also be adjusted according to input and output voltages to maintain a relatively constant switching frequency.

The regulator of FIG. 2 may be similarly controlled. As shown in FIG. 4b, switch 34 is maintained in an open state and switch 27 is maintained in a closed state throughout buck control operation. At $t_0$, switch 22 is turned off and switch 33 is turned on. The decreasing inductor current in the path between the common ground and the output terminal is sensed by resistor 38. At time $t_1$, the current has fallen to the valley threshold and control circuit 44 turns on switch 22 and turns off switch 33 to connect the inductor between the input terminal and the output terminal. Switch 22 remains on and switch 33 remains off for a fixed time period thereafter. The end of the fixed time period terminates the cycle and switch 22 is then again turned off and switch 33 turned on. The on-time of switch 22 may also be adjusted according to input and output voltages to maintain a relatively constant switching frequency.

Figure 5A:
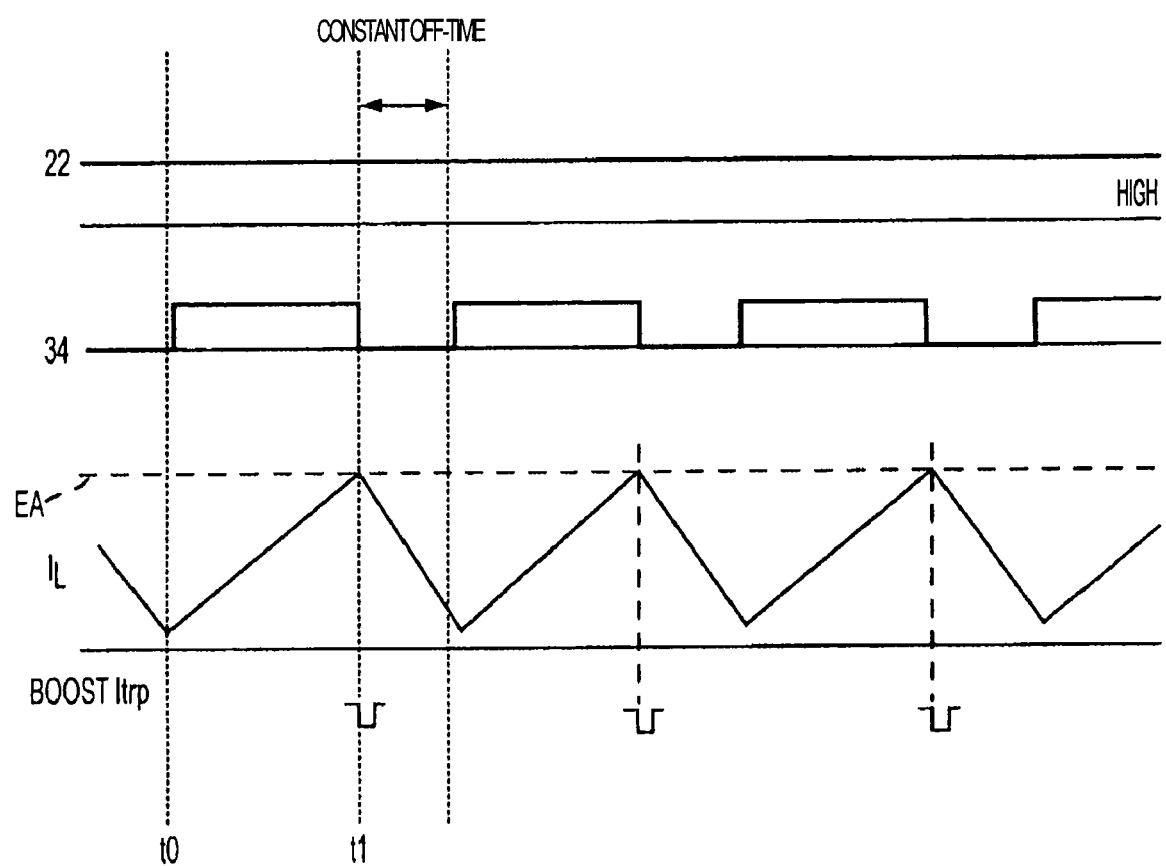
FIG. 5a is a waveform diagram for constant on-time/constant off-time boost mode operation of the regulator of FIG. 1.
Figure 5B:
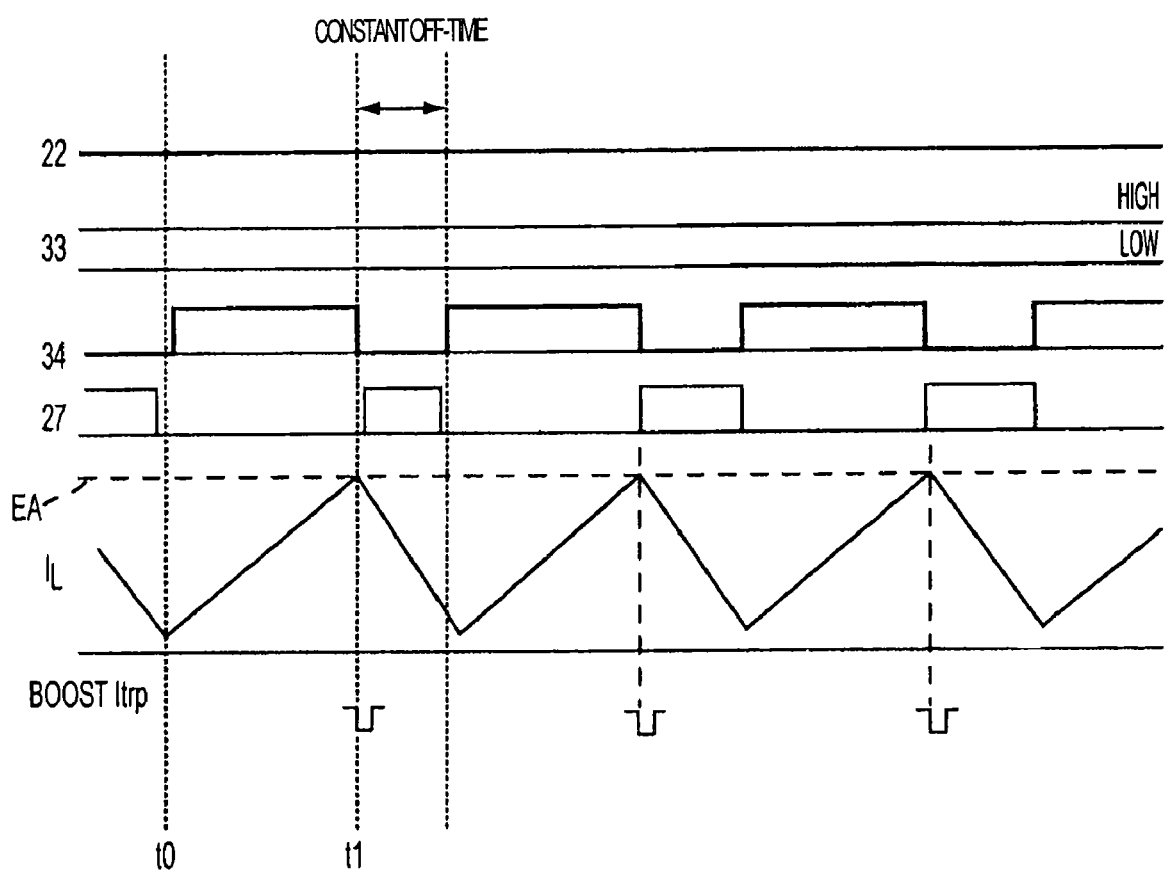
FIG. 5b is a waveform diagram for constant on-time/constant off-time boost mode operation of the regulator of FIG. 2.

Variable frequency switching control for boost mode operation of the regulators of FIG. 1 and FIG. 2 is illustrated in FIG. 5a and FIG. 5b, respectively. In each regulator, switch 22 is maintained in an on state throughout the boost mode operation. In the regulator of FIG. 2, switch 33 is maintained in an off state throughout the boost mode operation. At $t_0$, both regulators are controlled to connect the inductor between the input terminal and the common ground terminal to draw current from the power source. This configuration is obtained in the regulator of FIG. 1 by turning on switch 34 and in the regulator of FIG. 2 by turning on switch 34 and turning off switch 27. The rising inductor current is sensed by resistor 38 and reaches a peak threshold value at time $t_1$. In each regulator, switch 34 is then turned off, and switch 27 in the regulator of FIG. 2 is turned on, thereby to connect the inductor between the input terminal and the output terminal. Switch 34 is kept off for a fixed time. The inductor remains so connected for a fixed time period. The end of the fixed time terminates the cycle. The switch 34 off-time may also be adjusted according to input and output voltages to maintain a relatively constant switching frequency.

Figure 6A:
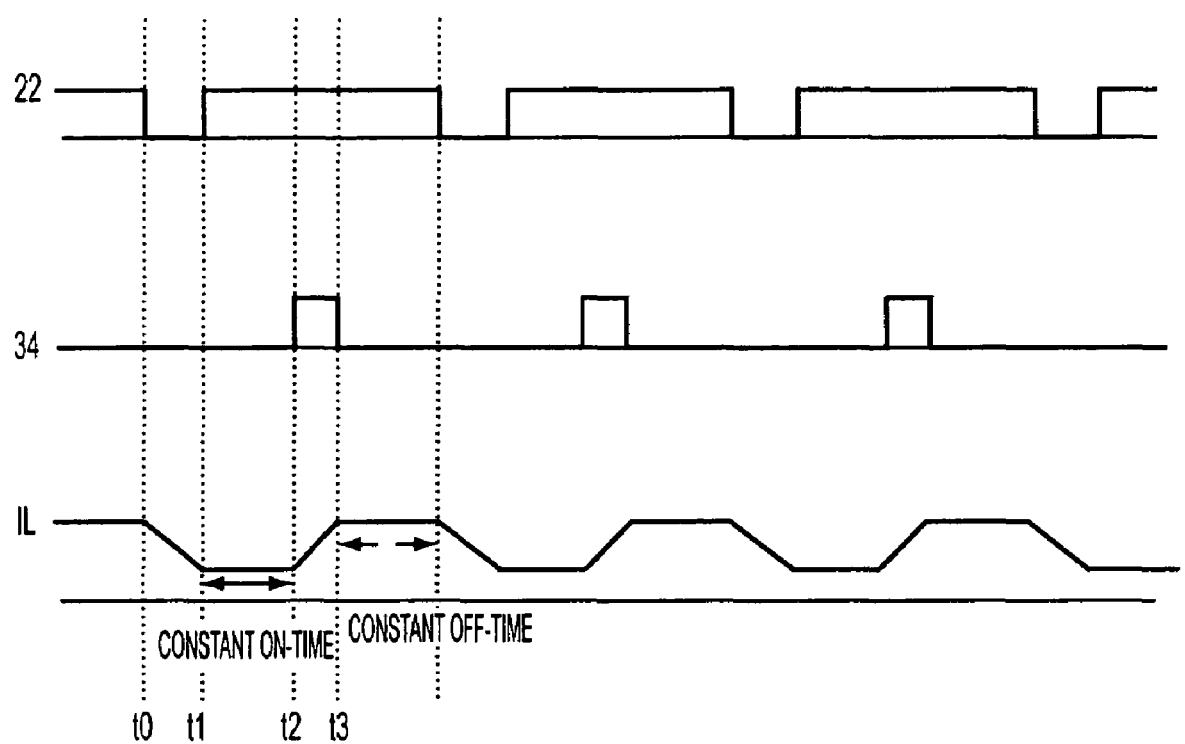
FIG. 6a is a waveform diagram for constant on-time/constant off-time buck/boost mode operation of the regulator of FIG. 1 when voltage input is equal to or slightly greater than the controlled output voltage.
Figure 6B:
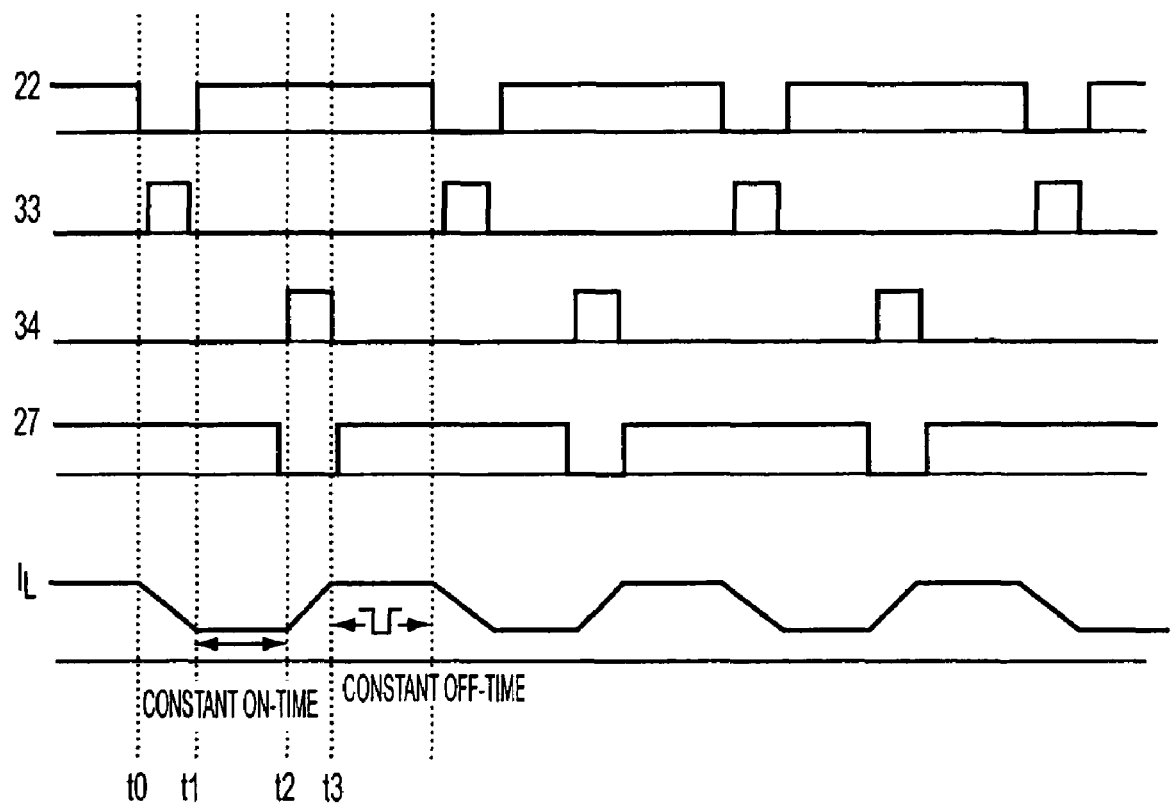
FIG. 6b is a waveform diagram for constant on-time/constant off-time buck/boost mode operation of the regulator of FIG. 2 when voltage input is equal to or slightly greater than the controlled output voltage.

When the input voltage is approximately the same as the preset output voltage the regulators of FIG. 1 and FIG. 2 operate, in buck-boost current control mode. FIGS. 6a and 6b show typical waveforms for this mode, wherein the input voltage is slightly higher than, or equal to, the output voltage. At $t_0$, switches 22 and 34 of each regulator are both in the off state. Switches 33 and 27 are both in the on state. The inductor is now connected between the common ground and the output terminal, the decreasing inductor current being sensed by resistor 38. At time $t_1$, the current has fallen to the valley threshold and control circuit 44 sets switches 22 and 27 on and switches 33 and 34 off. The inductor is now connected between the input terminal and the output terminal. The switches remain in this configuration for a fixed time period until $t_2$. The control circuit then sets switches 22 and 34 on and switches 33 and 27 off. The inductor is now connected between the voltage input terminal and the common ground, causing the inductor current to increase. At $t_3$, the current has risen to a second threshold level and the control circuit again sets switches 22 and 27 on and switches 33 and 34 off. These settings are maintained for a fixed time period to complete the control cycle. During the fixed time periods between $t_1$ and $t_2$ and between $t_3$ and the end of the cycle, the level of inductor current does not vary significantly.

Figure 7A:
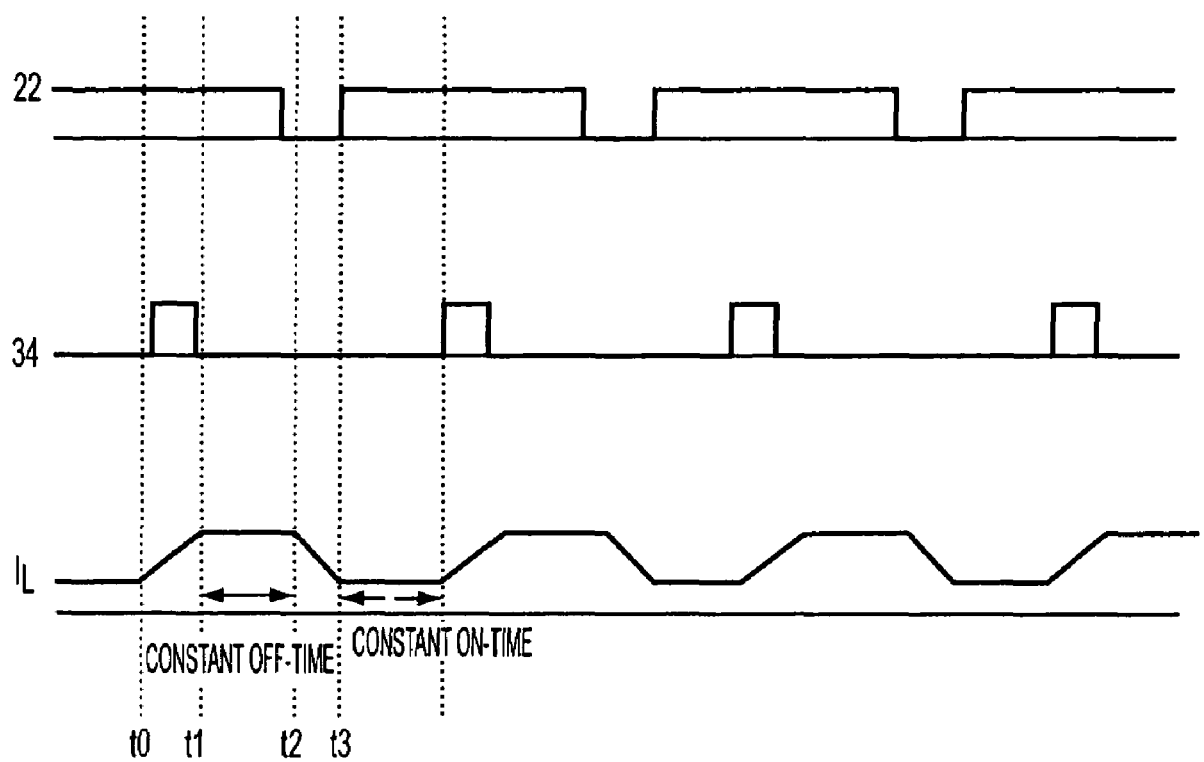
FIG. 7a is a waveform diagram for constant on-time/constant off-time buck/boost mode operation of the regulator of FIG. 1 during conditions in which the voltage input is equal to or slightly less than the controlled output voltage.
Figure 7B:
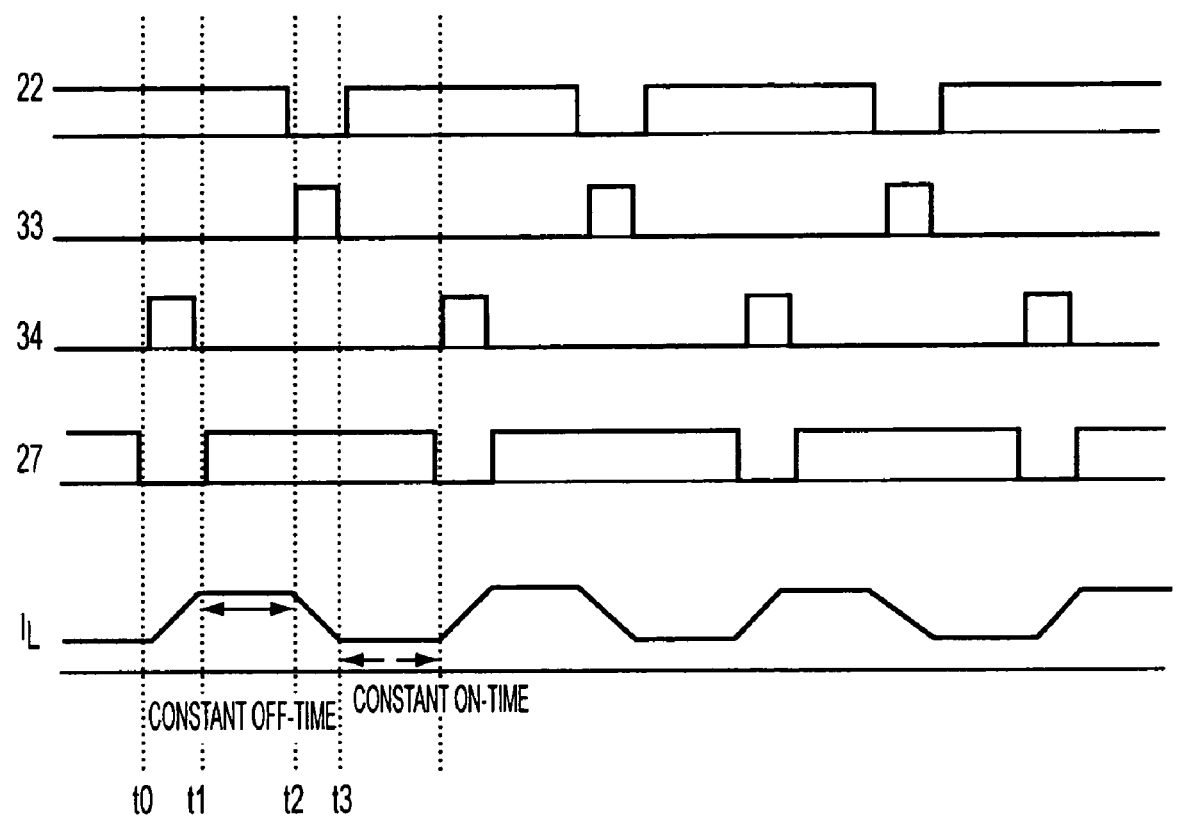
FIG. 7b is a waveform diagram for constant on-time/constant off-time buck/boost mode operation of the regulator of FIG. 2 during conditions in which the voltage input is equal to or slightly less than the controlled output voltage.

FIGS. 7a and 7b are waveforms for buck-boost mode operations for the two switch regulator of FIG. 1 and the four switch regulator of FIG. 2, respectively, when the input voltage is slightly lower than, or equal to, the output voltage. At $t_0$, both regulators are controlled to connect the inductor between the input terminal and the common ground. Switches 22 and 34 of each regulator are both set to the on state. Switches 33 and 27 are both in the off state. The increasing inductor current in the path between the input terminal and ground is sensed by resistor 38. At time $t_1$, the current has risen to a peak threshold and control circuit 44 sets switches 22 and 27 on and sets switches 33 and 34 off. The inductor is now connected between the input terminal and the output terminal. The switches remain in this configuration for a fixed time period. At $t_2$, switches 27 and 33 are set on and switches 22 and 34 are set off. The inductor is now connected between ground and the output terminal. When the inductor current has fallen to a second threshold level at $t_3$, the control circuit sets switches 22 and 27 on, and switches 33 and 34 off. The switches remain in this configuration for a fixed period to end the control cycle.

As evident from the waveforms of FIGS. 6a and 6b, at the beginning of each cycle buck mode current valley sensing operation takes place, followed by boost mode peak current sensing operation occurs. Operation for the waveforms of FIGS. 7a and 7b starts with boost mode peak current sensing, followed by buck mode valley current sensing in each cycle. Whether buck-boost operation starts each cycle in buck mode or boost mode can be determined from the sensed current in the preceding cycle.

Taking the current waveform of FIG. 5a as an example, if within a minimum on-time of switch 34 the sensed inductor current stays lower than a reference level, at the next cycle the regulator will start buck-boost operation from boost mode in the manner exemplified by FIG. 5a. If within the minimum on-time of switch 34, the sensed inductor current is already higher than the reference level, at the next cycle the regulator will start buck-boost operation from buck mode in the manner exemplified in FIG. 6a. In the latter case, if, within a minimum off-time of switch 22 the sensed inductor current remains higher than a reference level, the regulator will start buck-boost operation in the next cycle from buck mode. If, however, within the minimum on-time of switch 33 the sensed inductor current is already lower than the reference level, the regulator will start buck-boost operation in the next cycle from boost mode, as exemplified in FIG. 7a. Similar determinations can be made for the four switch regulator and during variable frequency operation.

Figure 8:
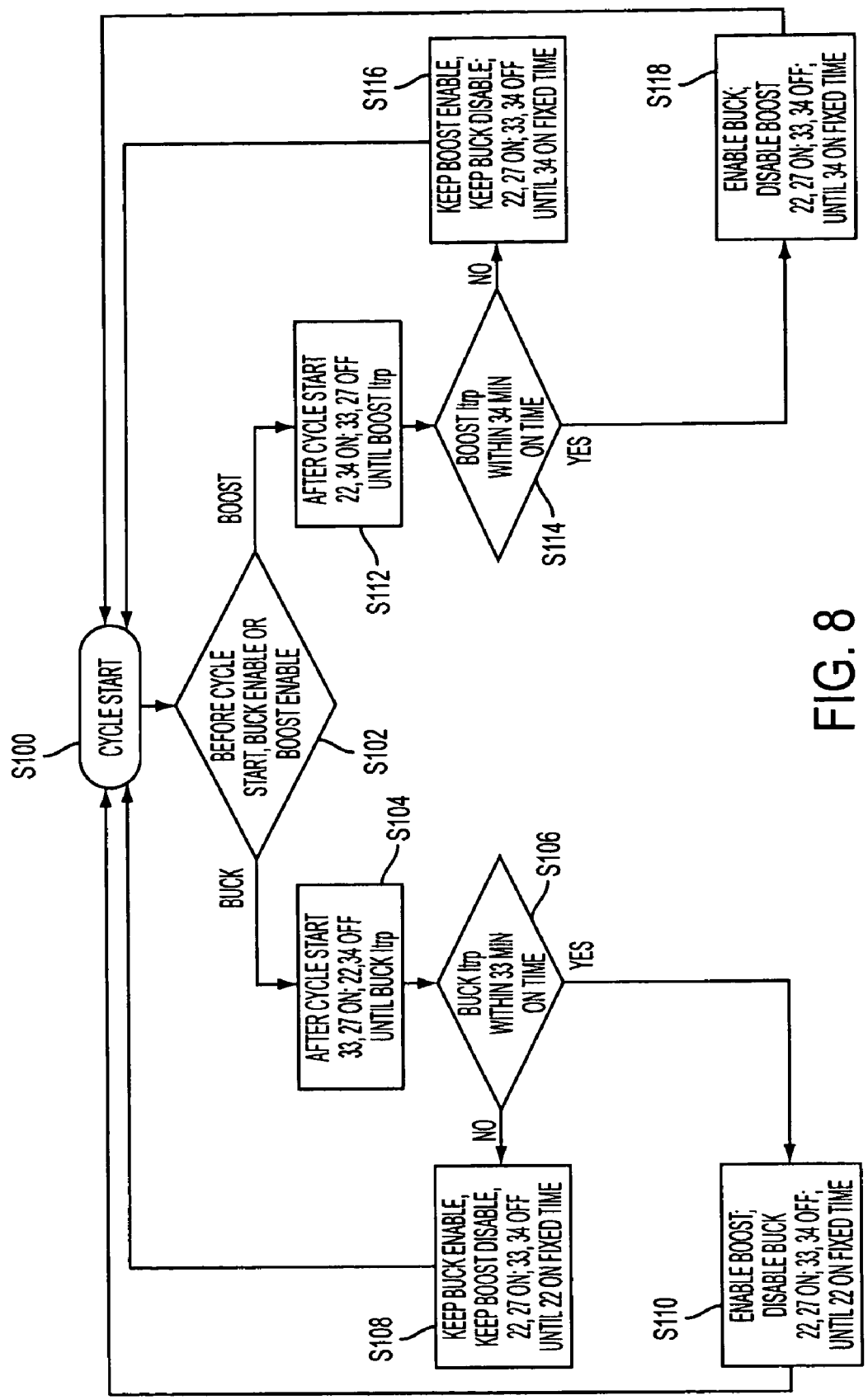
FIG. 8 is a flow chart illustrative of constant frequency switching control for the various operations of regulator of FIG. 2.

FIG. 8 is a flow chart by which the control circuit performs the constant on-time/constant off-time operations described above for the four switch configuration of FIG. 2. Step S100 begins each cycle. At step S102, determination is made of whether operation is to be in buck mode or boost mode at the beginning of the cycle. If the determination in this step is buck mode, the buck comparator is enabled and the boost comparator is disabled and operation proceeds to step S104. In this step switches 33 and 27 are on and switches 22 and 34 are off until a buck interrupt signal is output by buck comparator 54. This signal is indicative that the inductor current has fallen to the valley threshold level and that a change in switch states is to occur.

At step S106, determination is made as to whether the buck interrupt signal is generated within a minimum on time of switch 33. If not, at step S108 buck enable and boost disable conditions are maintained with switches 22 and 27 maintained on and switches 33 and 34 maintained off from the occurrence of the buck interrupt signal for a fixed time to complete the cycle. The operation flow returns to step S100 for continued operation in buck mode.

If determination is made at step S106 that the buck interrupt signal is generated within the minimum on time of switch 33, a buck-boost transition is indicated. At step S110, the boost comparator is enabled and the buck comparator disabled, switches 22 and 27 are turned on and switches 33 and 34 turned off for a fixed time to complete the cycle. Operation flow returns to step S100 for operation in boost mode, as determined in step 102. At step S112, the cycle starts with switches 22 and 34 on and 33 and 27 off until a boost interrupt signal is output by boost comparator 56.

At step S114, determination is made whether the boost interrupt signal is generated within the minimum on time of switch 34. If not, at step S116 boost enable and buck disable conditions are maintained with switches 22 and 27 maintained on and switches 33 and 34 maintained off from the occurrence of the boost interrupt signal for a fixed time to complete the cycle. The operation flow returns to step S100 for continued operation in boost mode.

If determination is made at step S114 that the boost interrupt signal is generated within the minimum on time of switch 34, a buck-boost transition is indicated. At step S118, the boost comparator is disabled and the buck comparator enabled, switches 22 and 27 are turned on and switches 33 and 34 turned off for a fixed time to complete the cycle. Operation flow returns to step S100 for operation in buck mode.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A regulator circuit for step-up and step-down operation having an input connectable to a power source and an output connectable to a load, the regulator circuit comprising:
    an inductor having first and second terminals;
    a first switch connected between the first inductor terminal and an input terminal;
    a second switch connected between the second inductor terminal and a node;
    a first rectifying device connected between the first inductor terminal and the node;
    a second rectifying device connected between the second inductor terminal and an output terminal;
    a sensing element for sensing inductor current connected between the common connection and a node joining the second switch and the first rectifying device; and
    a control circuit responsive to sensed inductor current for controlling activation and deactivation of at least one of the switches for a constant time to regulate voltage at the output to a preset voltage.

2. A regulator circuit as recited in claim 1, wherein the constant time of switch activation and deactivation can be adjusted according to input and output voltage to maintain a relatively constant switching frequency.

3. A regulator circuit as recited in claim 1, wherein the control circuit comprises:
    comparator circuitry;
    a logic circuit connected to the comparator circuitry to receive input therefrom; and
    switch driver circuitry responsive to the logic circuit for controlling the states of the switches.

4. A regulator circuit as recited in claim 3, wherein the comparator circuitry comprises:
    an error amplifier having a first input for receiving a voltage proportional to the voltage at the output terminal and a second input for receiving a reference potential to produce a difference signal representing the difference therebetween; and
    a differential circuit responsive to the difference signal and the inductor current sensing element, the differential circuit connected to the logic circuit.

5. A regulator circuit as recited in claim 4, wherein the differential circuit comprises a first circuit section for receiving a signal output from the current sensing element and a second circuit section for receiving the signal output from the current sensing element with inverted polarity.

6. A regulator circuit as recited in claim 1, wherein the level of the input voltage can be greater, equal to, or less than the preset voltage.

7. A voltage regulator circuit as recited in claim 6, wherein the preset voltage is greater than the input voltage and the control circuit operates in boost mode wherein:
    the first switch is maintained in an ideally closed state and the second inductor terminal is connected in succession alternately between a common potential, via the second switch in a closed state, and the output terminal, via the second rectifying device.

8. A voltage regulator circuit as recited in claim 7, wherein the second switch is in an on state at the beginning of each cycle of operation, is turned off in response to the sensed current rising to a reference threshold level, and remains off for a fixed time period thereafter to complete the cycle.

9. A regulator circuit as recited in claim 8, wherein the fixed time period that the second switch is off can be adjusted according to input and output voltage to maintain a relatively constant switching frequency.

10. A regulator circuit as recited in claim 6, wherein the preset voltage is less than the input voltage and the control circuit operates in buck mode wherein:
    the second switch is maintained in an open state and the first inductor terminal is connected in succession alternately between a common potential, via the first rectifying device, and the input terminal, via the first switch in a closed state.

11. A voltage regulator circuit as recited in claim 10, wherein the first switch is in an off state at the beginning of each cycle of operation, is turned on in response to the sensed current falling to a reference threshold level, and remains on for a fixed time period thereafter to complete the cycle.

12. A regulator circuit as recited in claim 11, wherein the fixed time period that the first switch is on can be adjusted according to input and output voltage to maintain a relatively constant switching frequency.

13. A regulator circuit as recited in claim 1, wherein the input voltage is approximately the same as the preset output voltage and the control circuit operates in buck-boost mode wherein:
    the first switch and second switch are individually controlled and the first switch is in a closed state a majority of the time during cycled operation.

14. A regulator circuit as recited in claim 13, wherein the first and second switches are controlled in response to the sensed inductor current and a voltage proportional to the output voltage.

15. A regulator circuit as recited in claim 14, wherein, the control circuit operates in a buck mode in one portion of an operating cycle and operates in a boost mode in another portion of the operating cycle.

16. A regulator circuit as recited in claim 15, wherein boost mode operation follows buck mode operation during an operating cycle.

17. A regulator circuit as recited in claim 15, wherein buck mode operation follows boost mode operation during an operating cycle.

18. A regulator circuit as recited in claim 14, wherein the input voltage is approximately the same as the preset output voltage, and, at the beginning of each cycle, the first switch is turned off followed by a brief turn on of the second switch.

19. A regulator circuit as recited in claim 14, wherein the input voltage is approximately the same as the preset output voltage, and at the beginning of each cycle, the second switch is turned on followed by a brief turn off of the first switch.

20. A regulator circuit for step-up and step down operation having an input connectable to a power source and an output connectable to a load, the regulator circuit comprising:
    an inductor;

a first switch connected between a first inductor terminal and an input terminal;

a second switch connected between the first inductor terminal and a common connection;

a third switch connected between the second inductor terminal and the common connection;

a fourth switch connected between the second inductor terminal and an output terminal; and a control circuit responsive to current in the inductor for controlling activation and deactivation of at least one of the switches for a constant time to regulate voltage at the output to a preset voltage.

21. A regulator circuit as recited in claim 20, wherein activated on time of the first switch and deactivated off time of the third switch can be adjusted according to input and output voltage to maintain a relatively constant switching frequency.

22. A regulator circuit as recited in claim 20, wherein the control circuit comprises:

comparator circuitry;

a logic circuit connected to the comparator circuitry to receive input therefrom; and switch driver circuitry responsive to the logic circuit for controlling the states of the switches.

23. A regulator circuit as recited in claim 22, wherein the comparator circuitry comprises:

an error amplifier having a first input for receiving a voltage proportional to the voltage at the output terminal and a second input for receiving a reference potential to produce a difference signal representing the difference therebetween; and a differential circuit responsive to the difference signal and the inductor current sensing element, the differential circuit connected to the logic circuit.

24. A regulator circuit as recited in claim 23, wherein the differential circuit comprises a first circuit section for receiving a signal output from the current sensing element and a second circuit section for receiving the signal output from the current sensing element with inverted polarity.

25. A regulator circuit as recited in claim 20, wherein the level of the input voltage can be greater, equal to, or less than the preset voltage.

26. A voltage regulator circuit as recited in claim 25, wherein the preset voltage is greater than the input voltage and the control circuit operates in boost mode wherein:

the first switch is maintained in an ideally closed state and the second switch is maintained in an ideally open state;

the inductor is connected in succession alternately between a common potential, via the third switch in a closed state, and the output terminal, via the fourth switch in a closed state.

27. A voltage regulator circuit as recited in claim 26, wherein the third switch is in an on state at the beginning of each cycle of operation, is turned off in response to the sensed current rising to a reference threshold level, and remains off for a fixed time period thereafter to complete the cycle.

28. A regulator circuit as recited in claim 27, wherein activated on time of the first switch and deactivated off time of the third switch can be adjusted according to input and output voltage to maintain a relatively constant switching frequency.

29. A regulator circuit as recited in claim 25, wherein the preset voltage is less than the input voltage and the control circuit operates in buck mode wherein:

the third switch is maintained in an open state and the fourth switch is maintained in an ideally closed state;

the inductor is connected in succession alternately between a common potential, via the second switch in a closed state, and the input terminal, via the first switch in a closed state.

30. A voltage regulator circuit as recited in claim 29, the first switch is in an off state at the beginning of each cycle of operation, is turned on in response to the sensed current falling to a reference threshold level, and remains on for a fixed time period thereafter to complete the cycle.

31. A regulator circuit as recited in claim 30, wherein activated on time of the first switch and deactivated off time of the third switch can be adjusted according to input and output voltage to maintain a relatively constant switching frequency.

32. A regulator circuit as recited in claim 20, wherein the input voltage is approximately the same as the preset output voltage and the control circuit operates in buck-boost mode wherein:

the first switch and the second switch are controlled to be in reciprocal conductive states to one another;

the third switch and the fourth switch are controlled to be in reciprocal conductive states to one another; and the first switch and the fourth switch are in an ideally closed state a majority of the time during cycled operation.

33. A regulator circuit as recited in claim 32, wherein, the control circuit operates in a buck mode in one portion of an operating cycle and operates in a boost mode in another portion of the operating cycle.

34. A regulator circuit as recited in claim 33, wherein boost mode operation follows buck mode operation during an operating cycle.

35. A regulator circuit as recited in claim 33, wherein buck mode operation follows boost mode operation during an operating cycle.

36. A regulator circuit as recited in claim 35, wherein the four switches are controlled in response to the sensed inductor current and a voltage proportional to the output voltage.

37. In a circuit comprising an inductor having first and second terminals, a first switch connected between the first inductor terminal and an input terminal, a second switch connected between the second inductor terminal and a common connection, a first rectifying device connected between the first inductor terminal and the common connection, and a second rectifying device connected between the second inductor terminal and an output terminal, a method for regulating the voltage at the output terminal approximately the same as, the voltage at the input terminal, the method comprising the steps of:

sensing current in the inductor;

with both switches in an off state at a beginning portion of each cycle, in response to the sensed current falling to a first threshold level, turning the first switch on;

maintaining the first switch on for a fixed time period thereafter;

turning the second switch on at the expiration of the fixed time period;

in response to the sensed current rising to a second threshold level thereafter, turning the second switch off;

maintaining the second switch off a fixed time to the end of the cycle; and turning the first switch off at the end of the cycle.

38. A regulator circuit as recited in claim 37, wherein activated on time of the first switch and deactivated off time of the second switch can be adjusted according to input and output voltage to maintain a relatively constant switching frequency.

39. In a circuit comprising an inductor having first and second terminals, a first switch connected between the first inductor terminal and an input terminal, a second switch connected between the second inductor terminal and a common connection, a first rectifying device connected between the first inductor terminal and the common connection, and a second rectifying device connected between the second inductor terminal and an output terminal, a method for regulating the voltage at the output terminal approximately the same as, the voltage at the input terminal, the method comprising the steps of:

sensing current in the inductor;

with both switches in an on state at a beginning portion of each cycle, in response to the sensed current falling to a first threshold level, turning the second switch off;

maintaining the second switch off for a fixed time period thereafter;

turning the first switch off at the expiration of the fixed time period;

in response to the sensed current falling to a second threshold level thereafter, turning the first switch on;

maintaining the first switch on for a fixed time to the end of the cycle; and turning the second switch on at the end of the cycle.

40. A regulator circuit as recited in claim 39, wherein activated on time of the first switch and deactivated off time of the second switch can be adjusted according to input and output voltage to maintain a relatively constant switching frequency.

41. In a circuit comprising an inductor having first and second terminals, a first switch connected between the first inductor terminal and an input terminal, a second switch connected between the first inductor terminal and a common connection, a third switch connected between the second inductor terminal and the common connection, and a fourth switch connected between the second inductor terminal and an output terminal, a method for regulating the voltage at the output terminal at a level approximately the same as, the voltage at the input terminal, the method comprising the steps of:

sensing current in the inductor;

setting the first and third switches to an off state and the second and fourth switches to an on state at the beginning portion of each cycle;

in response to the sensed current falling to a first threshold level, setting the first and fourth switches on and the second and third switches off;

maintaining the first switch on for a first fixed time period thereafter;

setting the third switch on and the fourth switch off at the expiration of the fixed time period;

in response to the sensed current rising to a second threshold level, turning the third switch off and the fourth switch on for a second fixed time period to the end of the cycle.

42. A regulator circuit as recited in claim 41, wherein activated on time of the first switch and deactivated off time of the third switch can be adjusted according to input and output voltage to maintain a relatively constant switching frequency.

43. In a circuit comprising an inductor having first and second terminals, a first switch connected between the first inductor terminal and an input terminal, a second switch connected between the first inductor terminal and a common connection, a third switch connected between the second inductor terminal and the common connection, and a fourth switch connected between the second inductor terminal and an output terminal, a method for regulating the voltage at the output terminal approximately the same as, the voltage at the input terminal, the method comprising the steps of sensing current in the inductor;

setting the first and third switches to an on state and the second and fourth switches to an off state at the beginning portion of each cycle;

in response to the sensed current rising to a first threshold level, turning the third switch off and the fourth switch on;

maintaining the third switch off for a first fixed time period thereafter;

turning the first switch off and the second switch on at the expiration of the fixed time period;

in response to the sensed current falling to a second threshold level, turning the first switch on and the second switch off for a second fixed time period to the end of the cycle.

44. A regulator circuit as recited in claim 35, wherein activated on time of the first switch and deactivated off time of the third switch can be adjusted according to input and output voltage to maintain a relatively constant switching frequency.

\* \* \* \* \*